United States Patent [19]

Sherman

[11] 4,069,805

[45] Jan. 24, 1978

[54] WIRE APPARATUS FOR ABRASIVE POWDER MACHINING

[76] Inventor: Philip Sherman, 4817 Crisp Way, San Diego, Calif. 92117

[21] Appl. No.: 762,556

[22] Filed: Jan. 25, 1977

[51] Int. Cl.$^2$ .............................................. B28D 5/00
[52] U.S. Cl. .............................. 125/30 WD; 51/59 SS
[58] Field of Search ............................ 51/59 R, 59 SS; 125/30 R, 30 WD

[56] References Cited

U.S. PATENT DOCUMENTS

| 1,714,869 | 5/1929 | Haddow | 125/30 WD |
| 2,312,014 | 2/1943 | Wallace | 51/59 R |
| 3,753,322 | 8/1973 | Brodes | 51/59 SS |

FOREIGN PATENT DOCUMENTS 1,215,662  4/1960  France ..................... 51/59 SS

*Primary Examiner*—Harold D. Whitehead
*Attorney, Agent, or Firm*—C. Bruce Hamburg

[57] ABSTRACT

A wire for machining with the aid of an abrasive comprises a core wire of a hard metallic material and wrapped therearound in an open helical configuration a band of a softer material which is sufficiently soft for the surface thereof to be impregnated with a subdivided abrasive material. Apparatus for machining a work piece constituted of a hard material by contacting the material with a moving wire, which may, for example, be the aforementioned wire, comprises means for holding the work piece in contact with the wire while, simultaneously, transmitting ultrasonic energy into the wire, vibrating the wire at frequencies lower than ultrasonic and reciprocating the wire lengthwise.

5 Claims, 3 Drawing Figures

WIRE APPARATUS FOR ABRASIVE POWDER MACHINING

BACKGROUND OF THE INVENTION

This invention relates to a wire and to an apparatus for machining with the aid of a subdivided abrasive material. More particularly, this invention relates to such a machining wire and such an apparatus for machining work pieces constituted of hard materials.

The term "machining" is used herein in a very comprehensive sense to include all operations in which the material of the work piece is removed or smoothed by abrasion, such as polishing, grinding, shaping, sawing or cutting and the like.

Articles made of hard materials, such as diamond, tungsten carbide and boron carbide, are machined with the aid of abrasive powders, for example diamond powder or slurries thereof. Such articles include, for example, wire drawing dies. In the manufacture and repair of such a die, the rough initial configuration of the die aperture is ground and polished to the final configuration or a worn die aperture is re-finished by reciprocating a wire in the aperture in the presence of an abrasive powder which may, for example, be applied to the wire or introduced into the aperture as a slurry. The grinding and polishing or other machining operation does not proceed as efficiently as could be desired.

It is an object of the invention to provide a wire apparatus for abrasive powder machining which will be more efficient than the wires and apparatuses of the prior art. The term "abrasive powder" is used herein in a sense which includes subdivided abrasive material generally, for example, a powder or a slurry.

Other objects and advantages of the invention will be apparent from the following description of the invention.

SUMMARY OF THE INVENTION

According to one aspect of the invention, there is provided a wire for machining a work piece constituted of a hard material by abrasion comprising a core wire of a hard metallic material and wrapped therearound in an open helical configuration a band of a softer material which is sufficiently soft for the surface thereof to be impregnated with a powdered abrasive material. The band of softer material may be fabricated in such a way that the surface thereof is impregnated with the powdered abrasive material prior to use of the machining wire and/or the machining wire may be used with a slurry of the powdered abrasive material, in the latter case the powdered abrasive material becoming impregnated into the surface of the band of the softer material during the use of the machining wire.

According to another aspect of the invention, there is provided apparatus for machining a work piece constituted of a hard material by contacting the material with a moving wire, the wire preferably, but not necessarily, being the aforementioned machining wire. The apparatus comprises means for holding a length of the wire in an extended, tensioned condition, means for transmitting ultrasonic energy into the wire, means for vibrating the wire at frequencies lower than ultrasonic while ultrasonic energy is being transmitted into the wire, means for reciprocating the wire lengthwise while the ultrasonic energy is being transmitted into the wire and the wire is being vibrated and means for holding the work piece in contact with the wire while ultrasonic energy is being transmitted into the wire, the wire is being vibrated at frequencies lower than ultrasonic and the wire is being reciprocated lengthwise. When the apparatus is to be used for machining the aperture of a wire drawing die, the means for holding the work piece comprises a rotatable means for supporting the die and means for rotating the rotatable means. The means for holding the work piece, that is the die, may further comprise support means for the rotatable means and means for adjusting the support means for varying the axis of the aperture relative to a line passing through the end points of the extended, tensioned length of wire from substantially coincident to oblique.

The invention will now be further described by reference to specific embodiments thereof as illustrated in the drawings.

DESCRIPTION OF A PREFERRED EMBODIMENT

Figure 1:
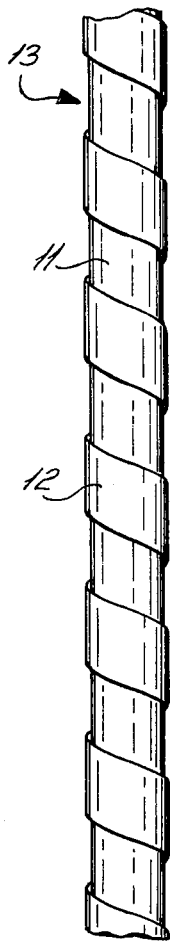
FIG. 1 is a side elevation of a segment of machining wire according to the invention.

The wire 13 for abrasive powder polishing and machining (FIG. 1), which for convenience will hereinafter be referred to as a "machining wire," consists of a core wire 11 made of a tough metal, the term "metal" herein including metal alloys, such as conventional grades of tungsten or tungsten alloys such as used for heating or light bulb filaments or the like, wrapped with a band 12, such as a tape or ribbon, of a softer material, such as conventional grades of copper or copper alloys, for example, 65% Cu, 17% Zn, 18% Ni, by weight, which are sufficiently soft so that the abrasive powder, such as diamond, boron carbide or the like, which is to effect the polishing and machining can be pressed into the surface of the band 12 before the band 12 is wrapped around the core 11 or the surface of the band 12 will similarly become impregnated with the abrasive powder during the use of the machining wire 13 with a slurry of the abrasive powder. The machining wire of the invention retains the abrasive powder better than the machining wire of the prior art and, consequently, is more effective. Another reason the machining wire of the invention is more effective is that the helical channel formed by the spaces between the turns of the band 12 around the core 11 facilitates the removal by the machining wire of the particles of hard material, such as diamond or tungsten carbide or boron carbide, being cut, polished or otherwise machined by the machining wire. Yet another advantage of the machining wire construction of the invention is that it allows the application of greater tension to the wire. The core 11 is not necessarily of circular cross section. Alternatively, the cross section of the core 11 may, for example, be quasi-rectangular with corners of the cross section rounded out to form roughly semi-circular shorter sides of the quasi-rectangle, in other words, the sort of shape that would be obtained by flattening a wire of circular cross-section, the core 11 itself in this case being a band. The core 11 may be in this flat configuration before it is wrapped with the band 12. Alternatively, the core 11 may be of circular cross section when wrapped with the band 12 and the thus fabricated machining wire may then be flattened thereby to flatten the core 11, for example by passing the machining wire between the rolls of a rolling mill.

If desired, the band 12 may be fabricated in such a way that the abrasive powder, such as diamond powder, is uniformly dispersed throughout the entire mass of the band. This may be accomplished, for example, by the following technique. Powdered copper or copper alloy or other relatively soft, sinterable metallic composition and, optionally, conventional additives for improving sinterability are thoroughly mixed with a relatively small proportion, for example 10% by weight, of abrasive powder of a desired uniform size, for example 10 microns. The mixture is compressed isostatically into a cylindrical rod, sintered and machined to a uniform cylindrical size. The rod is encased in a hollow cylindrical jacket of a conventional material, such as Ni, which will easily braze the band 12 to the core 11 and can be selectively etched off. For the same purpose, the core 11 may also be coated with such material as Ni. The band 12 is then swaged, drawn, to a 0.0015 inch diameter, for example, flattened and wrapped around the core 11. This intermediate product is then passed through a heated tubular furnace, whereupon the face of the band 12 in contact with the core 11 is brazed to the core 11. The other, outwardly directed face of the band 12 is then etched to expose the abrasive powder. Alternatively, if the machining wire is used with an abrasive slurry, the slurry will wear away the coating on the outwardly directed face of the band 12 to expose the abrasive powder.

The machining wire of the invention can be used, for example, in the manufacture and repair of diamond or tungsten carbide or boron carbide wire drawing dies. It can also be used for diamond or other abrasive powder assisted cutting of hard and brittle materials, such as the cutting of silicon into slices for the semiconductor industry. Another exemplary use of the machining wire of the invention is as a blade for a jeweler's hand saw.

Figure 2:
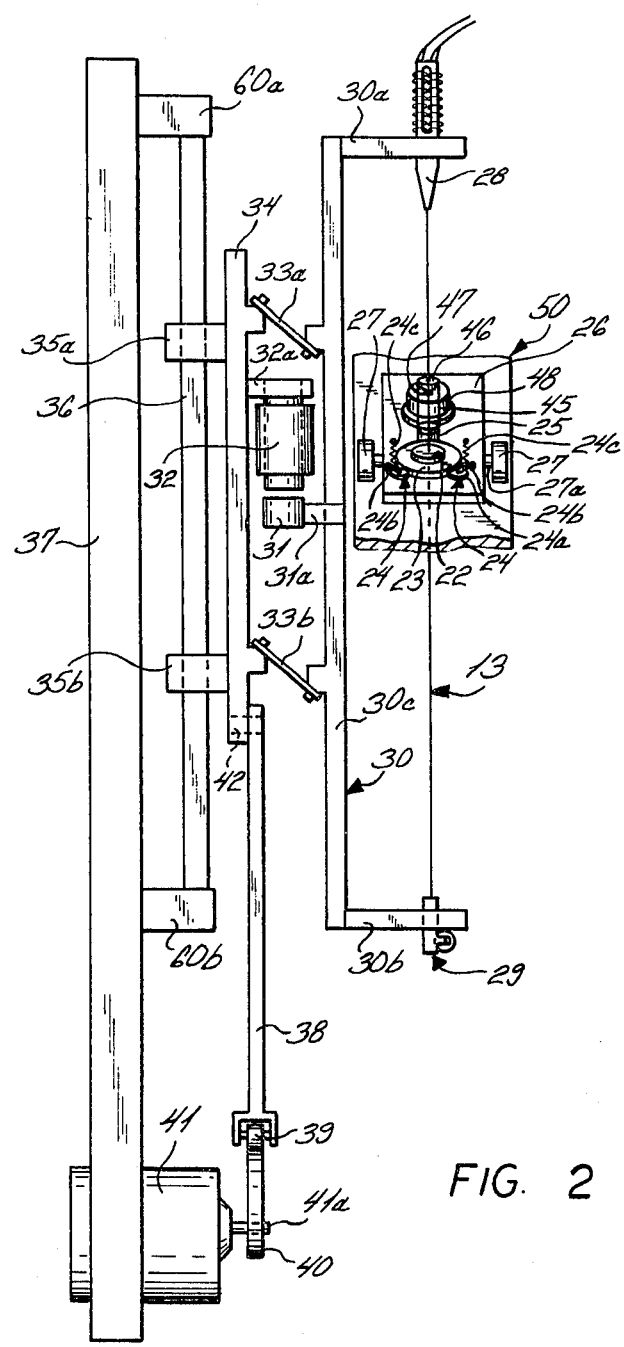
FIG. 2 is a front elevation of an apparatus according to the invention for machining the aperture of a wire drawing die.
Figure 3:
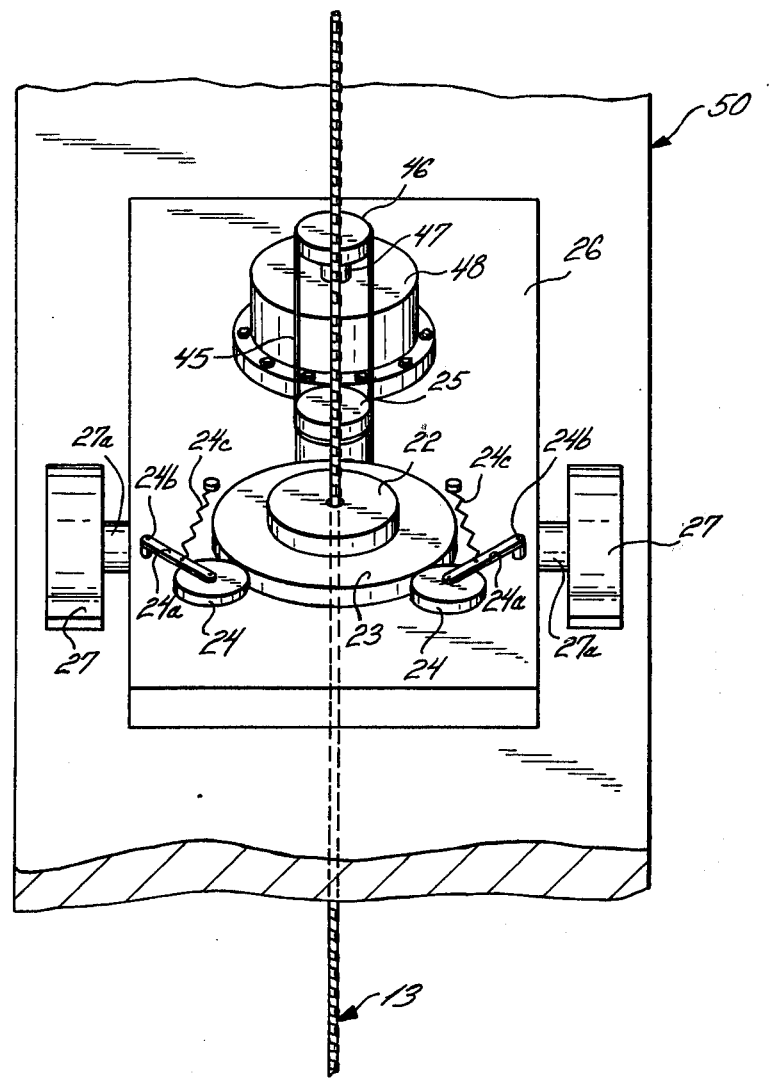
FIG. 3 is an enlarged view of a portion of the apparatus of FIG. 2.

The hereinabove described machining wires or other machining wires can be used in the machining apparatus of FIGS. 2 and 3. The apparatus of FIGS. 2 and 3 is set up for polishing a wire drawing die. However, as will be mentioned more particularly hereinbelow, the apparatus is readily adapted to other uses.

The wire drawing die 22 to be polished is mounted by means of a conventional adhesive was onto a supporting disc 23. The supporting disc 23 is held and rotationally driven on a table 26 by means which will be described hereinbelow. The supporting disc 23 and the table 26, are of course, each provided with an aperture in alignment with the aperture in the die 22 to permit passage of the machining wire 13. The disc 23 is rotatably supported on the table 26 by means of engagement of the periphery of the disc 23 by a driving drum 25 rotatably mounted on the table 26 and a pair of wheels 24 each of the latter of which is rotatably mounted at an end of a respective arm 24a the other end of which is pivotally mounted at 24b on the table 26, each arm 24a being biased toward the disc 23 by means of a respective spring 24c connected at one end to an arm 24a and at the other end to the table 26. The lower portion of the drum 25 is in engagement with the periphery of the disc 23, and the upper portion of the drum 25 is engaged by a drive belt 45 which is also received on a pulley 46 fixed to the drive shaft 47 of a motor 48 mounted on the table 26.

The table 26 is mounted on a horizontal rod 27a pivotally supported by a bracket 27 connected to a fixed support member 50. Consequently, the table 26 can be tilted and, in fact, is so illustrated in FIGS. 2 and 3. The fit between the rod 27a and the bracket 27 for pivotally receiving the rod 27a may be sufficiently tight that the table 26 will hold the orientation to which is is manually tilted until it is manually tilted to another orientation; on the other hand, any conventional locking means may be provided for this purpose. The vertical axis defined by the aligned apertures in the die 22, disc 23 and table 26 when the table 26 is horizontal is substantially coincident with the vertical axis of the extended, tensioned length of machining wire 13 held at its ends by means which will hereinbelow be described. Tilting of the table 26 causes the angle of contact of the machining wire 13 with the annular wall of the die aperture 22a to change whereby when the disc 23 and, consequently, the die 22 is rotated, the machining wire 13 polishes or otherwise machines the wall of the aperture 22a in the desired configuration.

The upper end of the machining wire 13 is attached to the tip of the horn of an ultrasonic transducer 28 so that the ultrasonic energy at the tip of the transducer 28 propagates through the length of the machining wire 13. The lower end of the machining wire 13 is held by a conventional tensioning device 29. A bracket 30 supports the transducer 28 and the tensioning device 29. The machining wire 13 may be tuned to the optimum ultrasonic conditions by increasing or decreasing the length of the wire between the tip of the ultrasonic transducer 28 and the tensioning device 29. This may be determined by experimentation before the assembly of the apparatus. Alternatively, that length may be made adjustable, for example by mounting either or both of the arms 30a and 30b of the bracket 30 for vertical adjustment on the spine 30c of the bracket 30.

The wire supporting bracket 30 is connected to a sliding bracket 34 by means of upper and lower flat or leaf springs 33a and 33b. An electromagnet coil and core assembly 32 is connected to the sliding bracket 34 by means of a bracket 32a fixed to the sliding bracket 34. Separated from the electromagnet coil and core assembly 32 by a small air gap and connected to the wire supporting bracket 30 by means of a bracket 31a is an electromagnet armature 31. Adjustability may be provided for the air gap, for example, by having the bracket 31a slidably mounted on the wire supporting bracket 30, the bracket 31a being locked, for example by means of a set screw, in whatever location on the wire supporting bracket 30 to which it is adjusted. By supplying halfway recitified 60 cycles per second alternating current to the coil of the electromagnet, the wire supporting bracket 30 is caused to vibrate at 120 cycles per second with respect to the sliding bracket 34, the amplitude of the vibrations being adjustable by any number of obvious means, such as adjusting the air gap or adjusting the power supplied to the electromagnet coil.

The sliding bracket 34 is slidably mounted on a pair of vertical slide rods 36 (only one of which is visible in FIG. 2 because they are directly behind each other) by means of upper and lower linear bearings 35a and 35b, the slide rods 36 being fixedly mounted on a support member 37 by means of upper and lower brackets 60a and 60b. The lower end of the sliding bracket 34 is pivotally connected to the upper end of a connecting rod 38 by means of a pivotal connection 42. A cam follower 39 is mounted on the lower end of the connecting rod 38. The cam follower 39 engages the periphery of an eccentric cam 40 mounted on the drive shaft 41a of a motor 41, the motor 41 being mounted on the support member 37. It is apparent that actuation of the motor 41 causes the sliding bracket 34 to reciprocate on the slide rods 36 with a stroke length equal to the difference in the distance between the axis of the shaft 41a and the closest and farthest points therefrom on the periphery of the cam 40, generally at least about 2 inches. The time period of the strokes is adjustable by adjusting the speed of the motor 41 and the length of the strokes is adjustable by any number of obvious means, such as by changing cams.

Hence, the apparatus of FIGS. 2 and 3 applies three types of energy to the polishing or other machining performed by the machining wire 13, namely, ultrasonic energy, ordinary vibratory energy and the energy of relatively large amplitude (as compared with vibrations) lengthwise reciprocal displacement of the machining wire 13. Each of these forms of energy can be applied to the wire either continuously or in the form of pulses of adjustable duration and magnitude. The frequency of the ultrasonic energy simply corresponds to the output of any conventional ultrasonic transducer. The vibratory frequency is 120 cycles per second when half rectified commonly available 60 cycles per second alternating current is applied to the electromagnet coil but other frequencies obviously can be used. The reciprocation is typically at a rate of about 5-10 cyclical strokes or cycles per second but this, too, is merely typical. Depending on such parameters as, for example, the nature of the machining wire, the nature of the abrasive, the nature of the material of the die, the intensity with which it is desired to abrade away the material of the die, the angle of the support table and so forth, the operating conditions may be adjusted by trial and error.

While the invention has been described with reference to a specific exemplary embodiment thereof, it is to be understood that this illustrates rather than limits the invention. Modifications, alterations and additions which would be obvious to one of ordinary skill in the art from the above description are intended to be within the scope of the invention. For example, for the sawing of a work piece by means of the machining wire, a machine like that of FIG. 2 may be used but in which the work piece is fed linearly into the machining wire.

What I claim is:

1. Apparatus for machining a work piece constituted of a hard material by contacting the material with a moving wire, comprising means for holding a length of the wire in an extended, tensioned condition, means for transmitting ultrasonic energy into the wire, means for vibrating the wire at frequencies lower than ultrasonic while ultrasonic energy is being transmitted into the wire, means for reciprocating the wire lengthwise while ultrasonic energy is being transmitted into the wire and the wire is being vibrated and means for holding the work piece in contact with the wire while ultrasonic energy is being transmitted into the wire, the wire is being vibrated at frequencies lower than ultrasonic and the wire is being reciprocated lengthwise.

2. Apparatus according to claim 1, in which the wire comprises a core wire of a hard metallic material and wrapped therearound in an open helical configuration a band of a softer material which is sufficiently soft for the surface thereof to be impregnated with a powdered abrasive material.

3. Apparatus according to claim 2, in which the surface of the band of softer material is impregnated with a powdered abrasive material.

4. Apparatus according to claim 1 for machining the aperture of a wire drawing die, in which the means for holding the work piece comprises a rotatable means for supporting the die and means for rotating said rotatable means.

5. Apparatus according to claim 4, in which the means for holding the work piece further comprises support means for the rotatable means and means for adjusting the support means for varying the axis of the aperture relative to a straight line passing through the end points of the extended, tensioned length of wire from substantially conicident to oblique.

* * * * *

UNITED STATES PATENT AND TRADEMARK OFFICE
CERTIFICATE OF CORRECTION

PATENT NO. : 4069805
DATED : January 24, 1978
INVENTOR(S) : Philip Sherman

It is certified that error appears in the above-identified patent and that said Letters Patent are hereby corrected as shown below:

Column 1, line 65, delete final "the".

Column 3, line 48, change "was" to --wax--;
        line 51, delete comma after "26";
        line 52, insert comma after "are".

Column 4, line 7, change "which is is" to --which it is--.

*Signed and Sealed this*

*Sixteenth* Day of *May 1978*

[SEAL]

Attest:

RUTH C. MASON
*Attesting Officer*

LUTRELLE F. PARKER
*Acting Commissioner of Patents and Trademarks*